United States Patent
Chan et al.

(10) Patent No.: US 6,446,170 B1
(45) Date of Patent: Sep. 3, 2002

(54) EFFICIENT STORE MACHINE IN CACHE BASED MICROPROCESSOR

(75) Inventors: Kin Shing Chan, Austin; Dwain Alan Hicks, Pflugerville; Michael John Mayfield; Shih-Hsiung Stephen Tung, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,239

(22) Filed: Jan. 19, 1999

(51) Int. Cl.$^7$ .............................................. G06F 12/00
(52) U.S. Cl. ...................... 711/132; 711/133; 711/210
(58) Field of Search ................................ 711/133, 210, 711/132, 138, 150, 151, 163, 167; 365/189.01, 189.04, 189.5, 223

(56) References Cited

U.S. PATENT DOCUMENTS

| | | | | | |
|---|---|---|---|---|---|
| 5,442,571 A | * | 8/1995 | Sites | ........................... | 364/403 |
| 5,758,178 A | * | 5/1998 | Lesartre | | |
| 5,809,550 A | * | 9/1998 | Shukla et al. | ................ | 711/167 |
| 5,829,029 A | * | 10/1998 | Shelly et al. | ................ | 711/133 |
| 5,875,472 A | * | 2/1999 | Bauman et al. | ............. | 711/150 |
| 5,893,151 A | * | 4/1999 | Merchant | .................... | 711/140 |
| 5,958,039 A | * | 9/1999 | Allen et al. | .................. | 712/202 |
| 6,021,471 A | * | 2/2000 | Stiles et al. | .................. | 711/140 |
| 6,023,747 A | * | 2/2000 | Dodson | ........................ | 711/141 |
| 6,035,376 A | * | 3/2000 | James | .......................... | 711/145 |

* cited by examiner

Primary Examiner—Matthew Kim
Assistant Examiner—Christian P. Chace
(74) Attorney, Agent, or Firm—Joseph P. Lally; Anthony V. S. England; J. Bruce Schelkopf

(57) ABSTRACT

A method of retiring operations to a cache. Initially, a first operation is queued in a stack such as the store queue of a retire unit. The first operation is then copied, in a first transfer, to a latch referred to as the miss latch in response to a resource conflict that prevents the first operation from accessing the cache. The first operation is maintained in the stack for the duration of the resource conflict. When the resource conflict is resolved, the cache is accessed, in a first cache access, with the first operation from the stack. Preferably, the first operation is removed from the stack when the resource conflict is resolved and the first cache access is initiated. In the preferred embodiment, the first operation is maintained in the miss latch until the first cache access results in a cache hit. One embodiment of the invention further includes accessing the cache, in a first miss access, with the first operation from the miss latch in response to a cache miss that resulted from the first cache access. In a presently preferred embodiment, a second access is executed to access the cache with a second operation queued in the stack in response to a cache hit resulting from the first cache access. The first and second cache accesses preferably occur in consecutive cycles. Typically, the first and second operations are store operations that are queued in the stack in program order. In one embodiment the first operation is removed from the stack upon resolving of the resource conflict.

17 Claims, 2 Drawing Sheets

| CYCLE | 0 | 1 | 2 | 3 | 4 |
|---|---|---|---|---|---|
| BST | op0 | op1 | op1 | op1 | op2 |
| LATCH | x | op0 | op0 | x | x |
| RC | y | N | N | N | |
| SEL | 0 | 1 | 1 | 0 | |
| HIT | | | y | – | y |
| MISS | | N | N | – | N |

| CYCLE | 0 | 1 | 2 | 3 | 4 |
|---|---|---|---|---|---|
| BST | op0 | op0 | op1 | op2 | |
| ML | x | op0 | op0 | x | |
| RC | y | N | N | N | |
| SEL | 0 | 0 | 0 | 512 | |
| HIT | | | y | y | y |
| MISS | 510 | 511 | N | N | N |

| CYCLE | 0 | 1 | 2 | 3 | 4 | 5 | 6 | 7 |
|---|---|---|---|---|---|---|---|---|
| BST | op0 | op0 | op0 | op1 | op1 | op1 | op1 | |
| ML | | op0 | op0 | op0 | op0 | op0 | x | |
| RC | y | y | N | N | N | N | N | |
| SEL | 0 | 0 | 0 | 0 | 1 | 1 | 0 | |
| HIT | | | 606 | N | – | y | – | |
| MISS | | | | y | – | N | – | |

| EA | RA | MESI | DATA |
|---|---|---|---|
| 308a | 306a | 304a | 302a |
| | | | |
| 308n | 306n | 304n | 302n |

EFFICIENT STORE MACHINE IN CACHE BASED MICROPROCESSOR

BACKGROUND

1. Field of the Present Invention

The present invention generally relates to the field of computer architecture and more particularly to a method and circuit for improving the efficiency of retiring store operations in microprocessor based computers.

2. History of Related Art

In typical modern microprocessor designs, cache-able store instructions are executed and retired to cache memory in program order. Because the number of load operations exceeds the number of stores by a significant margin in typical codes sequences and because many load operations may be speculatively executed to take advantage of processor parallelism, cache access arbitration schemes commonly assign relatively low priority to store operations. This prioritization hierarchy can potentially result in a backlog of executed store operations awaiting an opportunity to access the cache. The constraint of in-order execution and retirement is accommodated by placing completed store instructions in a completed store queue where they await resolution of conflicts from higher priority cache access requests. Higher priority cache accesses may occur in the form of snoop requests, cache status bits updates, and other cache accesses depending upon the environment. As a result, a large number of store instructions may become stockpiled in the store queue, especially in processor intensive applications such as multi-processor systems, thereby making it imperative to take maximum advantage of each opportunity to retire store operations to cache.

Conventional microprocessor architectures, unfortunately, do not typically handle the retiring of store operations in optimal fashion. Referring to FIG. 4 of the drawings, a timing representation of a store queue of a conventional microprocessor architecture is presented. For each cycle, the state of selected locations of the microprocessor are detailed. The "BST" represents the location within the store queue designed to hold the oldest pending store operation. In a typical microprocessor, the BST contents are transferred to a latch if a resource conflict is encountered during an attempt to access the cache from the store queue. In FIG. 4, a resource conflict denoted by reference number 402 is detected in cycle 0. In response to the resource conflict, the microprocessor transfers the BST contents (identified as op0) to the latch and shifts the next oldest pending operation (op1) to the BST. Thus, in cycle 1, op1 resides in BST as indicated by reference numeral 408 while op0 is found in the latch as indicated by reference numeral 406. Because op0 is no longer present within the store queue, a select signal SEL is set to indicate that the next pending store operation retired must be selected from the latch. In the example of FIG. 4, no resource conflict exists during cycle 1. Accordingly, the cache is accessed from the latch with op0 as indicated by reference number 412. The result of the cache access (i.e., hit/shared hit/miss, etc.) is not known until the following cycle 2. When the cache access is returned as a hit indicated by reference numeral 414, the select signal may be returned to 0 in the following cycle so that subsequently selected store operations are retired from the cache. Unfortunately, this architecture insures that no cache access may be attempted during cycle 2, despite the absence of a resource conflict, because the unknown result of the cache access prohibits updating the select signal until the following cycle. Thus, an opportunity to retire a pending store operation in cycle 2 has gone unfulfilled. Therefore, it would be desirable to provide an architecture in which the retiring of pending operations is handled in a more efficient manner without incurring any performance degradation and without significantly increasing the cost or complexity of the circuit.

SUMMARY OF THE INVENTION

The problems identified above are in large part addressed by a method and corresponding circuit for retiring executed operations to cache in an efficient manner by maintaining a store machine preferred state when a resource conflict preventing the store machine from accessing the cache is detected. This permits the store machine of the present invention to retire an operation in a cycle immediately following resolution of the resource conflict.

Broadly speaking, the present invention contemplates a method of retiring operations to a cache. Initially, a first operation is queued in a stack such as the store queue of a retire unit. The first operation is then copied, in a first transfer, to a latch referred to as the miss latch in response to a resource conflict that prevents the first operation from accessing the cache. The first operation is maintained in the stack for the duration of the resource conflict. When the resource conflict is resolved, the cache is accessed, in a first cache access, with the first operation from the stack. Preferably, the first operation is removed from the stack when the resource conflict is resolved and the first cache access is initiated. In the preferred embodiment, the first operation is maintained in the miss latch until the first cache access results in a cache hit. One embodiment of the invention further includes accessing the cache, in a first miss access, with the first operation from the miss latch in response to a cache miss that resulted from the first cache access. In a presently preferred embodiment, a second access is executed to access the cache with a second operation queued in the stack in response to a cache hit resulting from the first cache access. The first and second cache accesses preferably occur in consecutive cycles. Typically, the first and second operations are store operations that are queued in the stack in program order. In one embodiment the first operation is removed from the stack upon resolving of the resource conflict.

The present invention still further contemplates a system for retiring operations to a cache memory. The system includes a stack that is configured to save a first operation destined for the cache memory. A miss latch is coupled to the stack and configured to receive a first operation from the stack. A multiplexer of the system includes a first input connected to the stack, a second input coupled to the miss latch, an output connected to the cache memory, and a select input. A control circuit is coupled to the select input of the multiplexer. The control circuit is configured to select the first input of the mux and initiate copying, in a first transfer, of the first operation from the stack to the miss latch while maintaining the first operation in the stack. The first transfer occurs in response to a resource conflict preventing the stack from accessing the cache.

The control circuit preferably continues to select the first input of the mux for the duration of the resource conflict. In this manner, the stack acts as the source of a first access of the cache following a resolution of the resource conflict. In one embodiment, the system is further configured to access the cache, in a first cache access, with the first operation from the stack, in response to detecting a resolution of the resource conflict. The system preferably maintains the first operation in the miss latch until the first cache access results in a cache hit. In one embodiment, the control circuit selects the second input of the mux if the first cache access results in a cache miss. The system preferably accesses the cache, in a second cache access, with a second operation from the stack, in response to a cache hit resulting from the first cache access.

The present invention further contemplates a computer system including a processor, a cache memory, and a system memory. The processor is coupled to a processor bus via a bus interface unit. The cache memory is interfaced to the processing unit and the bus interface unit and the system memory coupled to bus interface unit. The processor includes a control circuit, a store queue, and a miss latch. The store queue is configured to save a first operation destined for the cache memory, and the control circuit is configured to copy the first operation to the miss latch, in response to a resource conflict preventing the store queue from accessing the cache, while maintaining the first operation in the store queue.

The store queue is suitably configured in one embodiment to save a second operation and the control circuit is configured to remove the first operation from the store queue in response to a first access of the cache memory after the resource conflict is resolved. In one embodiment, a second access of the cache memory with the second operation from the stack follows the first access. In this embodiment the first and the second accesses preferably occur in consecutive cycles of a clock signal driving the control circuit. The processor suitably further includes a mux for selecting between the miss latch and the store queue as a source for accessing the cache memory. In such an embodiment, a select input of the mux is driven by the control circuit and the control circuit is configured to select the store queue for at least a duration of the resource conflict. The control circuit is configured to select the miss latch upon detecting a cache miss resulting from an access of the cache memory from the stack.

BRIEF DESCRIPTION OF THE DRAWINGS

Other objects and advantages of the invention will become apparent upon reading the following detailed description and upon reference to the accompanying drawings in which.

Figure 1:
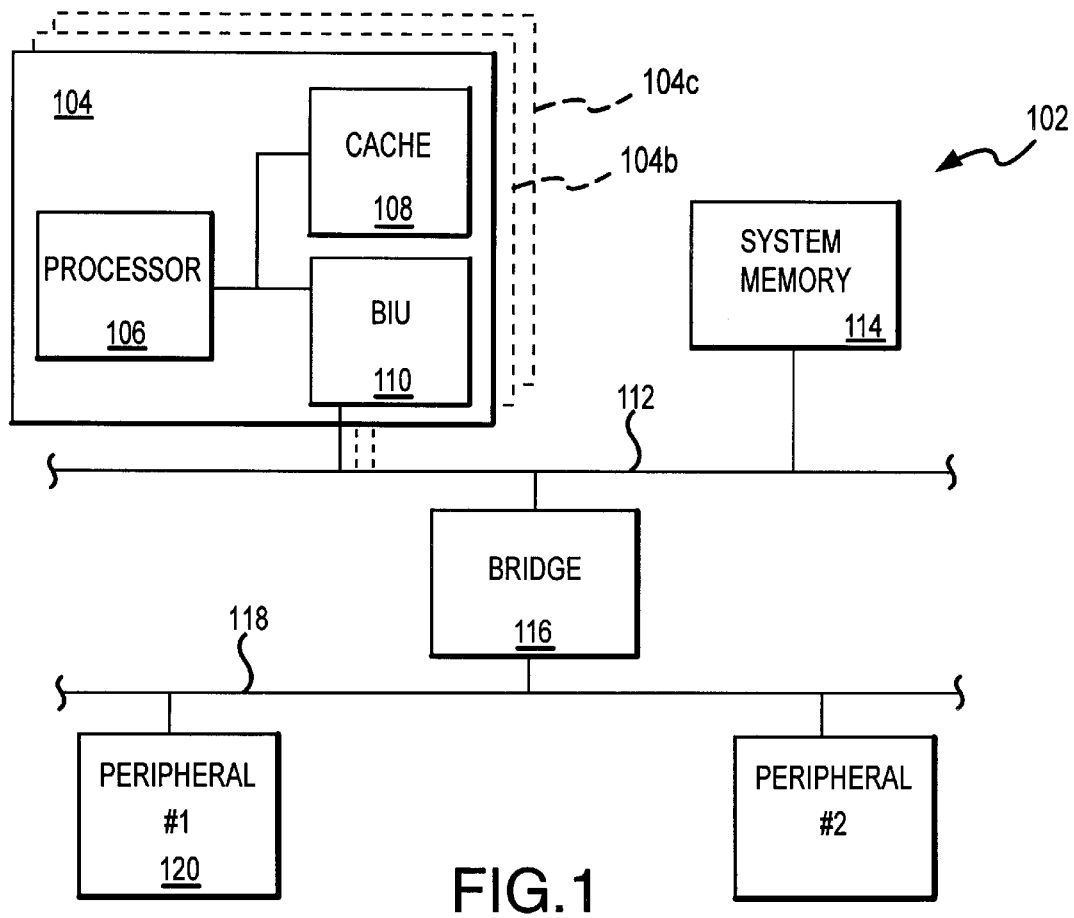
FIG. 1 is simplified block diagram of a computer system including a processor according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 presents a simplified block diagram of a computer system 102 including a bus agent 104 coupled to a system memory 114 over a processor bus 112. Bus agent 104, in one presently preferred embodiment is an integrated device including a processor 106, a cache memory 108, and a bus interface unit 110. Cache memory 108 may comprise the level one (L1) cache of processor 106 or, in an alternative embodiment, the L2 or higher cache of processor 108. Typically, cache memory 108, as described in greater detail below, includes a plurality of fast memory cells such as may be suitably configured with an array of static RAM devices. System memory 114 typically includes a larger array of less expensive, but somewhat slower, memory such as an array of dynamic RAM's. FIG. 1 shows additional processing agents (104b and 104c) to indicate the possibility of an embodiment in which multiple processing agents are coupled together over processor bus 112. Computer system 102 further includes, in the depicted embodiment, a bus bridge 116 coupled between processor bus 112 and a peripheral bus 118 to which one or more peripheral devices such as peripheral device 120 are connected. In a suitable embodiment, peripheral bus 118 is compliant with any of various industry standard interface busses to permit a wide variety of peripheral devices to be connected to computer system 102. Exemplary such peripheral bus standards include the PCI, ISA, and EISA standards, all of which are familiar to those familiar with microprocessor based computer architectures.

Figure 2:
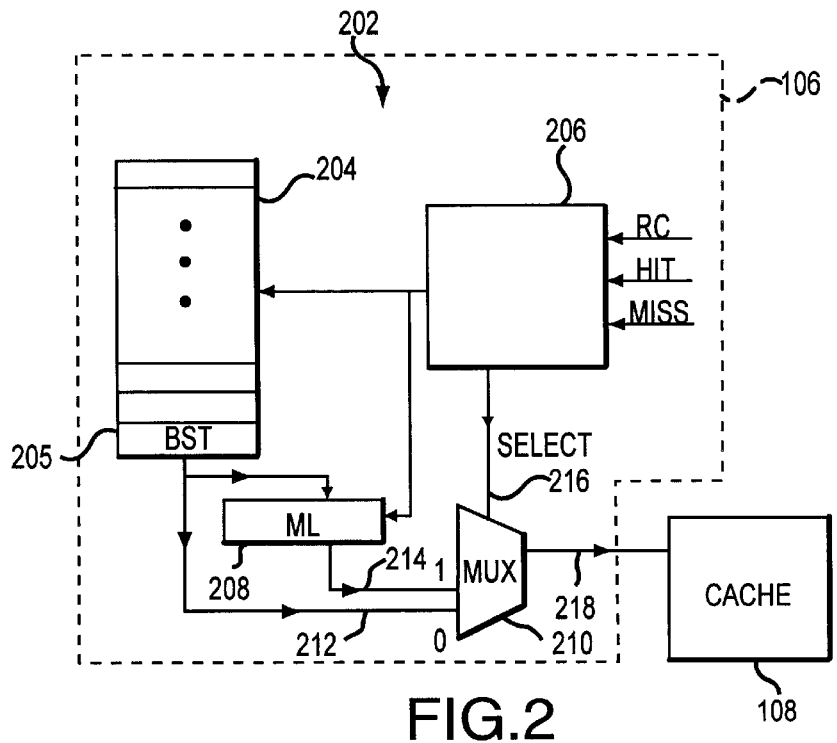
FIG. 2 is a block diagram of selected features of the processor of FIG. 1.

Turning now to FIG. 2, a simplified block diagram of a store machine 202 of computer processor 106 is presented. Store machine 202 includes a stack 204 coupled to a miss latch 208 and a mux 210. Mux 210 is connected to cache memory 108 and selects between stack 204 and miss latch 208 as a source of cache accesses when operations are retired. In the depicted embodiment, control signal 216 from control circuit 206 drives a select input of mux 210, miss latch 208 drives "1" input 214 and stack 204 (and, more particularly, BST 205) drives "0" input 212. An output signal 218 of mux 210 is connected to cache 108. In the preferred embodiment, stack 204 is configured as a temporary storage location for operations that have been executed by processor 106, but have yet to be retired to cache 108. Stack 204 is preferably implemented as a store queue and is configured to retain store operations that have been executed in program order, must be retired in program order, and are prohibited from executing speculatively.

Store machine 202 further includes a control circuit 206 connected to stack 204, miss latch 208, and mux 210. Control circuit 206 provides select signal 216 to mux 210 for selecting between stack 204 and miss latch 208. Control circuit 206 is configured to detect the absence or presence of resource conflicts (RC's). For purposes of this disclosure, a resource conflict is any event that prevents accesses to cache memory 108 by stack 204 or miss latch 208. Stack 204 includes a BST 205. BST 205 is configured to save the least recently executed (i.e., the oldest) operation that has yet to be retired to cache 108. In the preferred embodiment, control circuit 206 is designed to copy the contents of BST 206 to miss latch 208 if a resource conflict is detected by control circuit 206 during an attempted access of cache 108. The configuration of control circuit 206 is such that the copying of BST 205 to miss latch 208 is achieved without deleting the contents of BST 205. In other words the operation present in BST 205 when the resource conflict preventing access to cache 108 is detected is copied to miss latch 208 and retained in BST 205 for at least a duration of the resource conflict.

Because the oldest pending operation within stack 204 will be present in both BST 205 and miss latch 208 after the resource conflict is initially detected, control circuit is able to maintain mux 210 in a condition in which stack 204 sources subsequent attempted accesses of cache 108. When, in a subsequent cycle of a clock signal driving processor 106, control circuit 206 senses that no resource conflicts are present, an access of cache 108 is executed with the operation stored in BST 205 of stack 204. Once the access of cache 108 is initiated after the resolution of higher priority conflicts, control circuit 206 is preferably configured to remove the contents of BST 205 and shift the next oldest pending operation in stack 204 into BST 205. If the access of cache 108 initiated by control circuit 206 results in a cache hit, the next attempted access of cache 108 may proceed from stack 204 without requiring a change in the condition of mux 210. Even though the result of the cache access will typically not be detected until the subsequent cycle, control circuit 206 can initiate a second access of cache 108 if the initial cache access produces a cache hit because mux 210 does not require a state change. Thus, after a resource conflict is revolved, the present invention contemplates accessing cache 108 in back-to-back cycles following resolution of the conflict. If the initial cache access results in a cache miss, control circuit 206 drives select signal 216 to a condition such that mux 210 selects miss latch 208 as a source of subsequent attempted accesses of cache 108. Miss latch 208 is retained as the source at least until the next available access of cache 108 from stack 204 produces a cache hit.

Figures 3, 4, 5, 6:
FIG. 3 is a representation of an exemplary cache memory for use in one embodiment of the present invention.
FIG. 4 is a representative timing representation of a processor designed according to the prior art.
FIG. 5 is a representative timing representation of a processor designed according to the present invention.
FIG. 6 is an additional timing diagram illustrating various features of the processor according to the present invention.

Turning now to FIG. 3, an exemplary embodiment of cache memory 108 is presented. In this embodiment, cache 108 includes a plurality of cache lines 302, each of which is associated with an effective address (EA) 308, a real address (306), and one or more status bits 304. In the depicted embodiment, status bits 304 are maintained according to the MESI protocol familiar to those skilled in cache memory designs. Effective addresses 308 provide a mechanism by which an extremely large effective address space can be addressed regardless of constraints on the size of physical memory. Because many speculative operations may be carried out using effective address, cache memory 108 may be implemented with two or more effective address ports to permit simultaneous access to cache 108. Operations such as store operations, which are typically prohibited from being executed speculatively are constrained to access cache 108 through a real address port, of which only one may be incorporated into cache memory 108. Typically, real address 306 comprises fewer bits than effective addresses 308 reflecting the larger size of the effective address space. In embodiments of computer system 102 utilizing multiple bus agents 104, and in other applications in which real address accesses of cache memory 108 are relatively frequent, an efficient mechanism to retire pending store operations to cache 108 is paramount.

Turning now to FIGS. 5 and 6, timing diagrams are presented to illustrate selected features of the present invention. In FIG. 5, a first store operation (op0) resides in BST 205 in cycle 0. A resource conflict denoted by reference numeral 502 is detected. Resource conflict 502 prevents BST 205 from gaining access to cache 108. In response to RC 502, control circuit 206 transfers a copy of op0 to miss latch (ML) 208 without deleting or removing op0 from BST 205. In one embodiment, a full address compare is performed during cycle 0 despite the resource conflict. The result of this address comparison is then available in cycle 1, when the resource conflict has been resolved. This beneficially improves by allowing a full address compare in the same cycle as the cache is accessed. By enabling a full address comparison, fewer false address matches are detected. Thus, in cycle 1, FIG. 5 depicts op0 present in both BST 205 (as indicated at reference numeral 506) and in ML 208 (as indicated at reference numeral 504). It is noted that control circuit 206 does not alter select signal (SEL) 216 at reference number 508 in response to the presence of RC 502, but instead maintains stack 204 as the source of the next access of cache 108. In cycle 1, RC 502 has been resolved thereby permitting initiation of an access to cache 108 with op0 from BST 205 of stack 204 (this cache access is represented by reference numeral 510). In response to cache access 510 to cache memory 108, control circuit 206 removes op0 from stack 204 (although op0 is still retained in miss latch 208) and moves the next oldest operation, identified as op1, into BST 205 so that op1 is available from BST 205 in the next succeeding cycle (cycle 2). Cache access 510, which was initiated in cycle 1 returns a cache access result in cycle 2 at reference number 511. In the example of FIG. 5, cache result 511 is a cache hit. Those familiar with cache design will recognize that a cache hit result implies that the op0 can be successfully retired to cache 108 and that it is no longer necessary to retain op0 in store machine 202. Because cache result 511 is a cache hit control circuit 206 is configured to retain stack 204 as the source for subsequent cache accesses and store machine 202 is able to initiate in cycle 2 a second cache access 512, in which cache 108 is accessed by op1 from BST 205 of cache 204. Thus, the present invention contemplates retiring two operations from stack 204 in back-to-back clock cycles following resolution of a resource conflict.

Recalling the FIG. 4 timing representation of conventional store machine circuit reveals the increase in store retiring efficiency achieved by the present invention. Whereas the machine represented by the FIG. 4 depiction is unable to initiate retiring of op1 until cycle 3 following the resolution of RC 402, the store machine 202 of the present invention is able to initiate cache access 512 in cycle 2. In high end applications such as the multi processor embodiment of computer system 102 referred to previously, the improved efficiency may have a potentially significant beneficial impact on the performance of computer system 102.

Turning now to FIG. 6, a timing representation is presented to further illustrate additional features of store machine 202. Cycle 0 of FIG. 6 is essentially identical to cycle 0 of FIG. 5. A resource conflict 602 is detected preventing store machine 202 from accessing cache 108. In response, control circuit 206 copies op0 to miss latch 208 while retaining op0 in BST 205 (see reference numeral 603). In FIG. 6, unlike FIG. 5, the resource conflict is not resolved in cycle 1. Instead resource conflict 604 is detected, again preventing access of cache 108 by store machine 202. Referring to the representation of select signal 216 (identified as SEL in the figure), it is noted that store machine 202 retains select signal 216 in the "0" state indicative of BST 205 as the source of subsequent accesses to cache 108. In cycle 2, the resource conflicts have been resolved and an access 602 to cache 108 with op0 from BST 205 is initiated in a manner similar to access 510 of FIG. 5. As in the example of FIG. 5, the initiation of an access to cache 108 (i.e., the resolution of the resource conflicts) results in replacing op0 with op1 in BST 205 while maintaining op0 in miss latch 208. In the example of FIG. 6, unlike FIG. 5, cache access 606 results in a cache miss (indicated by reference numeral 608). In response to cache miss 608, control circuit 206 preferably drives select signal 216 to a "1" (indicated at reference numeral 610) in cycle 4 thereby selecting miss latch 208 as source for subsequent cache accesses. Cache access 611 is initiated in cycle 4, since no resource conflicts are present, with op0 from miss latch 208. Access 611 results in a cache hit indicated at reference numeral 612. In response to cache hit 612, control circuit returns select signal 216 to "0" to select BST 205 as source for subsequent cache accesses. Thus, FIG. 6 illustrates that control circuit 206 is configured to select miss latch 208 as source for subsequent cache accesses after detecting a cache miss and maintains miss latch 208 as source until a cache hit corresponding to an access from miss latch 208 is detected.

The present invention contemplates not only the control circuit 206, store machine 202, and computer system 102, but also a method by which operations are retired to a cache memory. In line with the preceding discussion, the method of the present invention includes queuing a first operation (op0) in a stack 204. The operation is suitably an executed store operation awaiting retirement to a cache memory 108. A first transfer is initiated in response to detecting a resource conflict that prevents store machine 202 from accessing cache memory 108. The first transfer includes copying the op0 to miss latch 208 while maintaining op0 in BST 205 of stack 204. First operation op0 is maintained in stack 204 for at least a duration of the resource conflict. After, and in response to, resolution of the resource conflict, a first cache accessed is initiated with first operation op0 from BST 205 of stack 204. Preferably, first operation op0 is removed from stack 204 in response to initiation of the first cache access to permit a second operation op1 to be potentially retired in an immediately succeeding clock cycle. First operation op0 is maintained in miss latch until the first cache access results in a cache hit, whereupon first operation op0 is retired and no longer need be maintained in either stack 204 or miss latch 208. If a cache access results in a cache miss, store machine 202 is preferably configured to execute a first miss access in which cache memory 108 is accessed with first operation op0 from miss latch 208, in response to the cache miss. If the first cache access results in a cache hit, a second cache access is initiated comprising a second queued operation op1 from stack 204. The first and second cache accesses preferably occur in consecutive cycles to achieve the highest possible system performance.

Thus, it will be apparent to those skilled in the art having the benefit of this disclosure that the present invention contemplates a circuit an method for. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of retiring operations to a cache, comprising:
    queuing a first operation in a stack;
    copying the first operation to a miss latch responsive to a resource conflict preventing the first operation from accessing the cache while maintaining the first operation in the stack for a duration of the resource conflict;
    responsive to resolution of the resource conflict, accessing the cache, in a first cache access, with the first operation from the stack and removing the first operation from the stack; and
    responsive to the first cache access resulting in a cache miss, subsequently accessing the cache with the first operation from the miss latch.

2. The method of claim 1, further comprising maintaining the first operation in the miss latch until accessing the cache with the first operation results in a cache hit.

3. The method of claim 1, further comprising queuing a second operation in the stack and accessing the cache, in a second cache access, with the second operation from the stack, the second cache access responsive to a cache hit resulting from the accessing the cache with the first operation.

4. The method of claim 3, wherein the first and second cache accesses occur in consecutive cycles.

5. The method of claim 3, wherein the first and second operations are queued in program order.

6. The method of claim 1, wherein the first and second operation comprise store operations prohibited from executing speculatively.

7. A system for retiring operations to a cache memory, comprising:
    a stack configured to save a first operation destined for the cache memory;
    a miss latch coupled to the stack and configured to receive a first operation from the stack;
    a multiplexer (mux) including a first input connected to the stack, a second input coupled to the miss latch, an output connected to the cache memory, and a select input; and
    a control circuit coupled to the select input of the multiplexer, wherein the control circuit is configured to select the first input of the mux and initiate copying, in a first transfer, of the first operation from the stack to the miss latch while maintaining the first operation in the stack, the first transfer responsive to a resource conflict preventing the stack from accessing the cache.

8. The system of claim 7, wherein the control circuit continues to select the first input of the mux for at least a duration of the resource conflict, wherein the stack sources a first access of the cache following a resolution of the resource conflict.

9. The system of claim 7, further configured to access the cache, in a first cache access, with the first operation from the stack, the first cache access responsive to resolution of the resource conflict.

10. The system of claim 9, further configured to maintain the first operation in the miss latch until the first cache access results in a cache hit.

11. The system of claim 9, wherein the control circuit selects the second input of the mux if the first cache access results in a cache miss.

12. The system of claim 9, further configured to access the cache, in a second cache access, with a second operation from the stack, the second cache access responsive to a cache hit resulting from the first cache access.

13. The system of claim 12, wherein the first cache access and the second cache access occur in successive cycles of a clock signal.

14. A computer system comprising:
    a processor coupled to a processor bus via a bus interface unit;
    a cache memory interfaced to the processor and the bus interface unit;
    a system memory coupled to the bus interface unit;
    wherein the processor includes a control circuit, a store queue, and a miss latch, wherein the control circuit is configured to copy a first operation contained in the store queue to the miss latch and further configured to maintain the first operation in the stack for the duration of a resource conflict preventing the store queue from accessing the cache and to maintain the first operation in the miss latch until accessing the cache with the first operation results in a cache hit.

15. The system of claim 14, wherein the store queue is further configured to contain a second operation and wherein the control circuit is configured to access the cache memory with the second operation in a cycle immediately following successively accessing the cache with the first operation.

16. The system of claim 14, wherein the processor further includes a mux for selecting between the miss latch and the store queue as a source for accessing the cache memory, wherein a select input of the mux is driven by the control circuit, and further wherein the control circuit is configured to select the store queue for at least a duration of the resource conflict.

17. The system of claim 16, wherein the control circuit is configured to select the miss latch upon detecting a cache miss resulting from an access of the cache memory from the stack.

* * * * *